United States Patent [19]

Dehnert et al.

[11] Patent Number: 4,965,346
[45] Date of Patent: Oct. 23, 1990

[54] HETEROCYCLIC AZO DYES CONTAINING CYANOTHIOPHENE DERIVATIVES AS DIAZO COMPONENTS AND DIAMINOPYRIDINES AS COUPLING COMPONENTS

[75] Inventors: Johannes Dehnert, Ludwigshafen; Gunther Lamm, Hassloch; Hermann Loeffler, Speyer, all of Fed. Rep. of Germany

[73] Assignee: BASF Aktiengesellschaft, Ludwigshafen, Fed. Rep. of Germany

[21] Appl. No.: 324,558

[22] Filed: Mar. 16, 1989

Related U.S. Application Data

[60] Division of Ser. No. 188,075, Apr. 28, 1988, Pat. No. 4,855,413, which is a continuation of Ser. No. 888956, Jul. 24, 1986, abandoned.

[30] Foreign Application Priority Data

Aug. 10, 1985 [DE] Fed. Rep. of Germany ....... 3528759

[51] Int. Cl.$^5$ .................. C09B 29/42; C09B 29/033; D06P 1/18; D06P 3/54
[52] U.S. Cl. ..................................... 534/766; 534/573
[58] Field of Search ............................ 534/766, 573 L

[56] References Cited

U.S. PATENT DOCUMENTS 3,998,802  12/1976  Dehnert et al. ..................... 534/766
4,042,578  8/1977  Dehnert et al. ..................... 534/766

FOREIGN PATENT DOCUMENTS 201896   11/1986  European Pat. Off. ............ 534/766
3528759  2/1987   Fed. Rep. of Germany ...... 534/766
3615093  11/1987  Fed. Rep. of Germany ...... 534/766

Primary Examiner—Floyd D. Higel
Assistant Examiner—Fiona T. Powers
Attorney, Agent, or Firm—Oblon, Spivak, McClelland, Maier & Neustadt

[57] ABSTRACT

The novel dyes of the general formula I

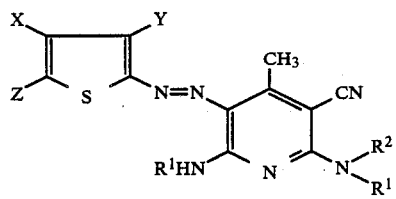

where X is hydrogen or $C_1$-$C_4$-alkyl or is phenyl which is unsubstituted or substituted by fluorine, chlorine, bromine, methyl, methoxy or nitro, Y is cyano, a carboxylic ester group or nitro, Z is cyano, acetyl, benzoyl or unsubstituted or substituted carbamyl, or X and Z or Y and Z may simultaneously be a carboxylic ester group, and $R^1$ and $R^2$ independently of one another are each hydrogen or unsubstituted or substituted alkyl or aryl, are very useful for dyeing polyesters, polyester/cellulose blends or thermoplastics.

6 Claims, No Drawings

HETEROCYCLIC AZO DYES CONTAINING CYANOTHIOPHENE DERIVATIVES AS DIAZO COMPONENTS AND DIAMINOPYRIDINES AS COUPLING COMPONENTS

This application, Ser. No. 07/324,558 is a divisional application of Ser. No. 07/188,075, filed Apr. 28, 1988, now U.S. Pat. No. 4,855,413, which in turn is a continuation of Ser. No. 07/888,956, filed July 24, 1986 and now abandoned.

The present invention relates to compounds of the general formula I

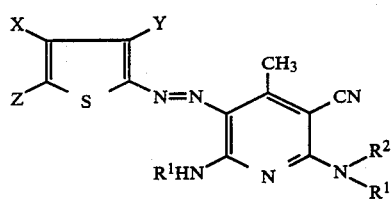

where X is hydrogen or $C_1$–$C_4$-alkyl or is phenyl which is unsubstituted or substituted by fluorine, chlorine, bromine, methyl, methoxy or nitro, Y is cyano, a carboxylic ester group or nitro, Z is cyano, acetyl, benzoyl or unsubstituted or substituted carbamyl, or X and Z or Y and Z may simultaneously be a carboxylic ester group, and $R^1$ and $R^2$ independently of one another are each hydrogen or unsubstituted or substituted alkyl or aryl.

Examples of substituted carbamyl radicals Z are $CONHR^3$ or

where $R^3$ is unsubstituted or substituted alkyl or phenyl or cyclohexyl, $R^4$ is unsubstituted or substituted alkyl and $R^3$ and $R^4$ together with the nitrogen may form a heterocyclic ring. Specific examples are $CONHCH_3$, $CONHC_2H_5$, $CONH$-n-$C_3H_7$, $CONH$-n-$C_4H_9$, $CONHCH_2CH(CH_3)_2$, $CONHC_2H_4OCH_3$, $CONHC_3H_6OCH_3$, $CONHC_2H_4OH$, $CONHC_3H_6OH$, $CONHC_6H_5$, $CONHC_6H_4CH_3$, $CONHC_6H_4OCH_3$, $CON(CH_3)_2$, $CON(C_2H_5)_2$, $CON(C_2H_4OCH_3)_2$ and $CON(CH_3)C_6H_5$.

Preferred carboxylic ester groups Y and, where relevant, X and Z are $COOCH_3$, $COOC_2H_5$, $COOC_3H_7$, $COOC_4H_9$ and $COOC_2H_4OCH_3$.

Examples of radicals $R^1$ and $R^2$ in addition to hydrogen are:

1. Unsubstituted or substituted alkyl, such as $CH_3$, $C_2H_5$, n-$C_3H_7$, $CH(CH_3)_2$, n-$C_4H_9$, $CH_2$-$CH(CH_3)_2$,

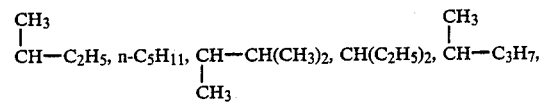

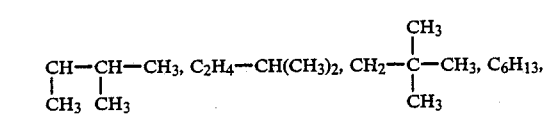

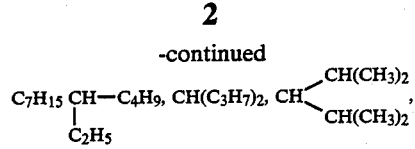

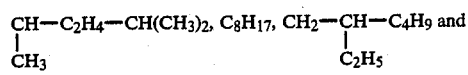

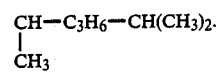

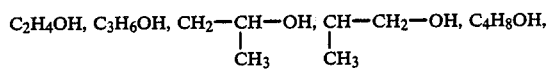

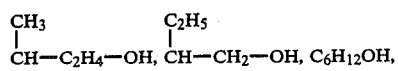

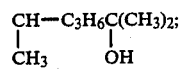

$C_2H_4OCH_3$, $C_2H_4OC_2H_5$, $C_2H_4OC_3H_7$, $C_2H_4OC_4H_9$, $C_2H_4OC_6H_5$, $C_2H_4OC_6H_{11}$, $C_2H_4CN$, $C_5H_{10}CN$, $C_6H_{12}CN$, $C_2H_4OC_2H_4CN$, $C_3H_6OC_2H_4CN$, $C_3H_6OCH_3$, $C_3H_6OC_2H_5$, $C_3H_6OC_3H_7$, $C_3H_6OC_4H_9$,

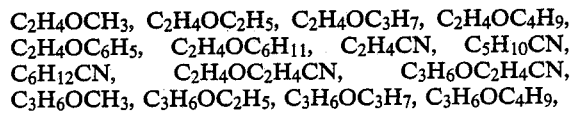

$C_3H_6OC_6H_{11}$, $C_3H_6OC_8H_{17}$, $C_3H_6OCH_2C_6H_5$, $C_3H_6OC_2H_4C_6H_5$, $C_3H_6OC_2H_4OC_6H_5$, $C_3H_6OC_6H_5$, $C_3H_6OC_2H_4OH$, $C_3H_6OC_4H_8OH$, $C_3H_6OC_2H_4OCH_3$, $C_3H_6OC_2H_4OC_2H_5$, $C_3H_6OC_2H_4OCH(CH_3)_2$, $C_3H_6OC_2H_4OC_4H_9$, $C_3H_6OC_2H_4OCH_2C_6H_5$, $C_3H_6OC_2H_4OC_6H_5$, $C_3H_6OC_4H_8OCH_3$, $C_3H_6OC_4H_8OC_2H_5$, $C_3H_6OC_4H_8OC_4H_9$, 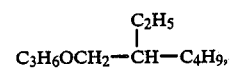

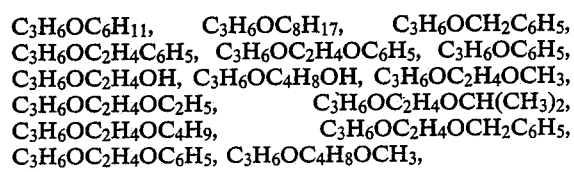

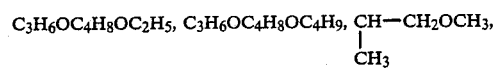

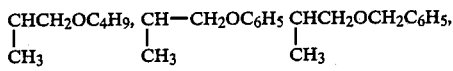

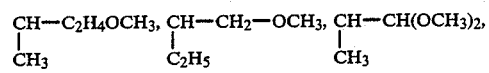

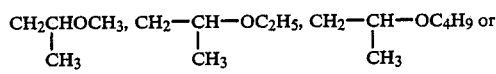

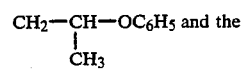 and the corresponding radicals which contain two $C_2H_4O$, $C_3H_6O$,

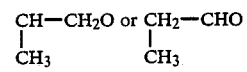

groups; and

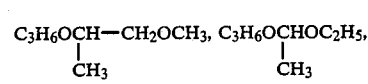

-continued

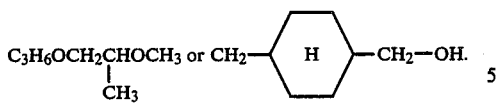 or 

2. Unsubstituted or substituted cycloalkyl:

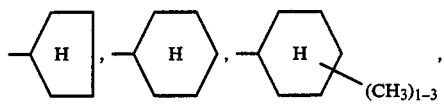

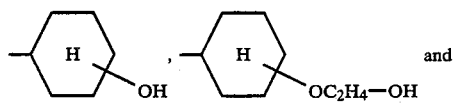

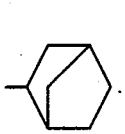

3. Unsubstituted or substituted aralkyl:

$CH_2-C_6H_5$, $C_2H_4-C_6H_5$, $CH_2\overset{CH_3}{\underset{|}{CH}}-C_6H_5$, $\overset{CH_3}{\underset{|}{CH}}C_2H_4-C_6H_5$, $C_2H_4\overset{CH_3}{\underset{|}{CH}}-C_6H_5$, $CH_2\overset{|}{\underset{OH}{CH}}-C_6H_5$, $\overset{C_2H_5}{\underset{|}{CH}}-C_6H_5$ and $\overset{C_3H_7}{\underset{|}{CH}}-C_6H_5$ and corresponding groups containing $C_6H_4CH_3$ or $C_6H_4OCH_3$ instead of $C_6H_5$.

4. Unsubstituted or substituted phenyl: $C_6H_5$, $C_6H_4CH_3$, $C_6H_3(CH_3)_2$, $C_6H_4OCH_3$, $C_6H_3(OCH_3)_2$, $C_6H_4Cl$ and $C_6H_2(OCH_3)_2Cl$.

5. The radicals: $CH_2CH=CH_2$, $CH_2COOCH_3$, $(CH_2)_5COOCH_3$, $(CH_2)_5COOC_2H_5$, $(CH_2)_5COO\overset{C_4H_9}{\underset{|}{O}}$, $(CH_2)_5COOCH_2\overset{C_2H_5}{\underset{|}{CH}}$ and 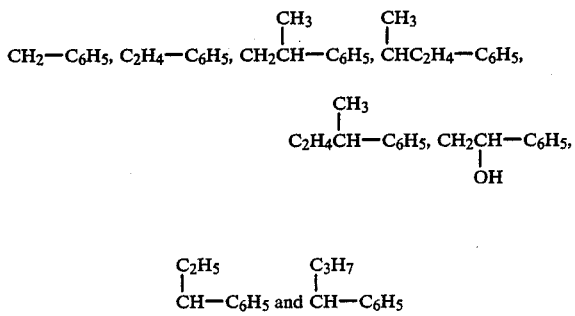, $C_4H_9$ where n=2, 3, 4 or 6.

6. Acyloxy radicals: $(CH_2)_2OCHO$, $(CH_2)_2OCO(CH_2)_nCH_3$, $(C_2H_4O)_2CHO$, $(C_2H_4O)_2CO(CH_2)_nCH_3$, $(CH_2)_3O(CH_2)_2OCHO$, $(CH_2)_3O(CH_2)_2OCO(CH_2)_nCH_3$, $(CH_2)_2O(CH_2)_4OCHO$, and $(CH_2)_2O(CH_2)_4OCO(CH_2)_nCH_3$, where n is from 0 to 7, and $(CH_2)_2OCOCH\overset{C_2H_5}{\underset{C_4H_9}{<}}$, $(CH_2)_2OCOC_6H_5$, $(CH_2)_2OCOC_6H_4CH_3$, $(CH_2)_2OCOC_6H_4Cl$, $(CH_2)_2OCONHCH_3$, $(CH_2)_2OCONHC_4H_9$, $(CH_2)_2OCONHCH_2CH\overset{C_2H_5}{\underset{C_4H_9}{<}}$ and $(CH_2)_2OCONHC_6H_5$, and the corresponding radicals containing $(CH_2)_3$ or $(CH_2)_4$ instead of $(CH_2)_2$.

7. Acyl radicals: CHO, $CH_3(CH_2)_nCO$, where n is from 0 to 7, $C_6H_5CO$, $CH_3C_6H_4CO$, $C_6H_5CH_2CO$, $C_6H_5OCH_2CO$, $CH_3SO_2$, $C_2H_5SO_2$, $C_6H_5SO_2$ and $CH_3C_6H_4SO_2$.

The compounds of the formula I can be prepared by reacting a diazonium compound of an amine of the formula

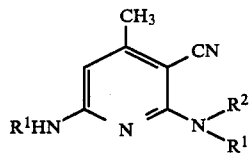

with a coupling component of the formula

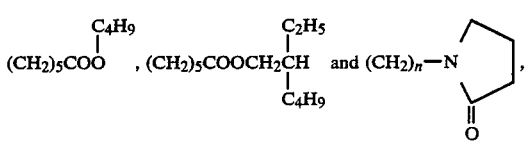

in a conventional manner. The Examples which follow illustrate the preparation, parts and percentages stated in the Examples being by weight, unless stated otherwise. The λ max values were determined in a mixture of dimethylformamide and glacial acetic acid in a ratio of 9:1.

The compounds of the formula I give deep, brilliant and very lightfast dyeings, in particular on polyester. They are also very useful for dyeing thermoplastics, such as polystyrene, polymethacrylate, polycarbonate, nylon and styrene/acrylic acid/butadiene copolymers, since they possess high color strength, lightfastness and thermal stability. Many novel dyes are also useful for dyeing and/or printing polyester/cotton blends in hues which are very lightfast and fast to laundering, by the method described in German Patent 1,811,796.

Of particular importance are dyes of the general formula Ia

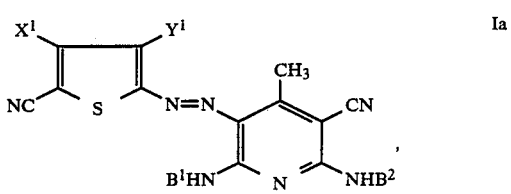

where $X^1$ is hydrogen, methyl or phenyl, $Y^1$ is cyano or a carboxylic ester group and $B^1$ and $B^2$ independently of one another are each (i) $C_2$–$C_8$-alkyl which is unsubstituted;

(ii) $C_2$–$C_8$-alkyl which is substituted by hydroxyl, $C_1$–$C_8$-alkanoyloxy, $C_1$–$C_4$-alkoxy, benzyloxy, or phenoxy;

(iii) $C_2$–$C_8$-alkyl which is interrupted by oxygen, exclusive of (ii); or (iv) $C_2$–$C_8$-alkyl which is interrupted by oxygen and substituted by hydroxy, $C_1$–$C_8$-alkanoyloxy, $C_1$–$C_4$-alkoxy, benzyloxy, or phenoxy, exclusive of (ii) and (iii);

(v) phenyl which is unsubstituted; or (vi) phenyl which is substituted by methyl or methoxyl.

Preferred carboxylic ester groups are $COOCH_3$ and $COOC_2H_5$.

Examples of particularly preferred radicals $B^1$ and $B^2$ are hydrogen and the radicals $C_2H_5$, $C_3H_7$, $C_4H_9$,

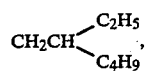

$C_6H_{11}$, $C_6H_5$, $C_6H_4CH_3$, $C_6H_4OCH_3$, $C_2H_4OH$, $C_3H_6OH$, $C_2H_4OCH_3$, $C_3H_6OCH_3$, $C_2H_4OC_2H_5$, $C_2H_4OC_4H_9$, $C_3H_6OC_2H_5$, $C_2H_4OC_2H_4OH$, $C_3H_6OC_2H_4OH$, $C_3H_6OC_4H_8OH$, $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, $C_3H_6OC_4H_8OC_4H_9$, $C_2H_4OC_2H_4OCO(CH_2)_mCH_3$, $C_3H_6OC_2H_4OCO(CH_2)_mCH_3$, $C_3H_6OC_4H_8OCO(CH_2)_mCH_3$, $C_2H_4OCO(CH_2)_mCH_3$, $C_3H_6OCO(CH_2)_mCH_3$, $C_3H_6OCH_2C_6H_5$ and $C_3H_6OC_2H_4OC_6H_5$, where m is from 1 to 4.

Examples of particularly preferred combinations of $B^1$ and $B^2$ are hydrogen and $C_2H_4OC_2H_4OCOCH_3$, $C_2H_4OC_2H_4OCOC_2H_5$, $C_3H_6OC_4H_8OH$, $C_3H_6OC_4H_8OCOCH_3$, $C_3H_6OC_4H_8OCOC_2H_5$, $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, $C_3H_6OC_4H_8OC_4H_9$, $C_3H_6OCH_2C_6H_5$, $C_3H_6OC_2H_4OC_6H_5$ or $C_3H_6OCH_2$—$CH(C_2H_5)C_4H_9$ and $C_2H_5$, $C_2H_4OCH_3$, $C_3H_6OCH_3$, $CH(CH_3)_2$ or $C_4H_9$ in combination with $C_2H_4OC_2H_4OCOCH_3$, $C_3H_6OC_4H_8OH$, $C_3H_6OC_4H_8OCHO$, $C_3H_6OC_4H_8OCOCH_3$, $C_3H_6OC_4H_8OCOC_2H_5$, $C_3H_6OC_2H_4OC_4H_9$, $C_3H_6OC_4H_8OC_2H_5$, $C_3H_6OC_4H_8OC_4H_9$ or $C_3H_6OC_2H_4OC_6H_5$ and $C_2H_4OH$, $C_3H_6OH$, $C_2H_4OCOCH_3$, $C_2H_4OCOC_2H_5$, $C_3H_6OCOCH_3$ or $C_3H_6OCOC_2H_5$ combined with $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, $C_3H_6OC_4H_8OC_4H_9$, $C_6H_4OCH_3$ or $C_6H_5$.

The process for the preparation of the 2,6-diaminopyridines which are substituted by acyloxyalkyl or acyloxyalkoxyalkyl and are free of by-products is also particularly important.

To date, azo dyes possessing such coupling components have had to be prepared by subsequent acylation of the corresponding hydroxyl-containing dyes in an anhydrous organic solvent with an acyl halide or an anhydride, since the coupling components themselves preferentially undergo N-acylation under these conditions; the N-acyl-2,6-diaminopyridines, however, are not capable of coupling.

According to the invention, the coupling components are prepared by adding not less than an equivalent amount of sulfuric acid to a solution or suspension of the hydroxyl-containing substituted pyridine in the desired organic acid and stirring at from 20° to 100° C., preferably from 20° to 50° C. The degree of acylation depends on the water content and reaches 100% in an anhydrous medium. However, the absence of water and 100% conversion are not necessary in every case in order to achieve optimum tinctorial properties. In most cases, a conversion of from 70 to 90% is sufficient; this conversion does not require anhydrous conditions and advantageously permits the acylation to be combined with the preparation of the hydroxyalkylaminopyridine.

The coupling components are, as a rule, isomer mixtures in which the substituents in the 2,6-positions are interchanged; however, different amounts of the isomers are present, depending on the preparation.

EXAMPLE 1

16.3 parts of 2-amino-3,5-dicyano-4-methylthiophene are dissolved in 250 parts of 65% strength sulfuric acid, while cooling. 31.5 parts of 40% strength nitrosylsulfuric acid are added dropwise at from 0° to +5° C. while cooling further, and the mixture is stirred for a further 1½ hours at this temperature. The coupling component used is obtained as follows: a thoroughly stirred mixture of 17 parts (based on dry substance) of water-moist 2-chloro-3-cyano-4-methyl-6-aminopyridine (obtained, for example, by the process described in German Patent 2,260,827), 20 parts by volume of isobutanol, 18 parts of 3-aminopropyl 4-hydroxybutyl ether and 8 parts of sodium carbonate is heated at 145°–150° C. for 5 hours under a descending condenser until a thin layer chromatogram shows that conversion is complete. The mixture is cooled to about 100° C., after which 35 parts of acetic acid are added dropwise, followed by the dropwise addition of 15 parts of 96% strength sulfuric acid at 35°–40° C. with further slight cooling. The mixture is stirred for 3 hours, after which about 92% of the hydroxy compound is acetylated. A solution of the diazonium salt is run into the thoroughly stirred mixture of 100 parts of the coupling components thus obtained, 300 parts of ice and 100 parts of water, and stirring is continued for about 2 hours at 0°–5° C. until the solution has been consumed. Thereafter, the coupling mixture is filtered under suction and the residue is washed neutral and dried at 80° C. The dark green powder ($\lambda$ max=527 in 9:1 dimethylformamide/acetic acid) contains about 80% of a product of the formula

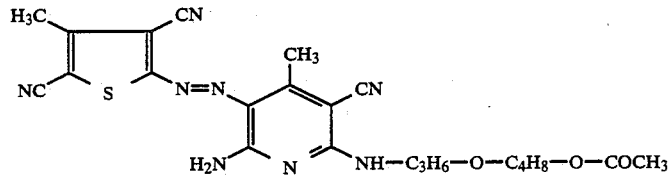

and about 20% of the unacetylated hydroxy compound. The dye mixture has very good tinctorial properties and, on polyester, gives brilliant red dyeings having very good lightfastness and fastness to plating.

EXAMPLE 2

If an equivalent amount of the coupling component described below is used under the preparation conditions of Example 1, the red dye ($\lambda$ max=537.8 nm in 9:1 dimethylformamide/acetic acid) of the formula

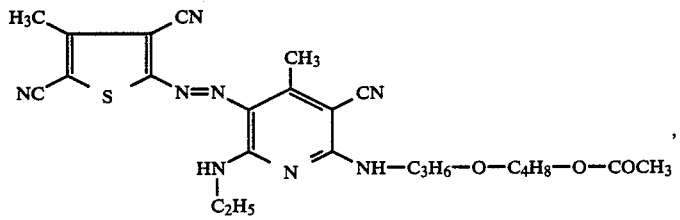

is obtained. This dye also contains about 20% of the hydroxy compound and dyes polyester in brilliant bluish red hues. The dyeings are very lightfast and fast to plating.

The coupling component is obtained as follows: 20 parts of 2-chloro-3-cyano-4-methyl-6-ethylaminopyridine (obtained as described in German Patent 2,260,827) in 20 parts by volume of isobutanol are heated with 18 parts of 3-aminopropyl-4-hydroxybutyl ether and 10.5 parts of sodium carbonate at 145° C., isobutanol and water being distilled off. Stirring is continued for 4 hours at 145°–150° C., until a thin layer chromatogram shows that conversion is complete. During cooling, from about 100° C., 30 parts by volume of glacial acetic acid are added dropwise, followed by the dropwise addition of 15 parts of 96% strength sulfuric acid at 40° C. while cooling with water. By stirring for 3 hours at 40° C., a conversion of about 93% is achieved.

The dyes shown in the Table below are obtained in a similar manner and likewise possess very good lightfastness and thermal stability.

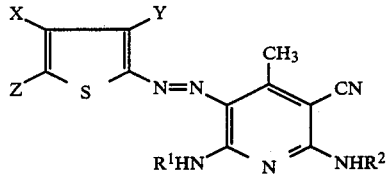

| Example No. | X | Y | Z | $R^1$ | $R^2$ | $\lambda$ max. [nm] (Acetone) |
|---|---|---|---|---|---|---|
| 3 | $CH_3$ | CN | CN | H | $C_3H_6OC_4H_8OCOCH_3$ | 526 |
| | | | | | $C_3H_6OC_2H_4O\text{-}\phi$ | |
| 4 | $CH_3$ | CN | CN | H | $C_3H_6OC_4H_8OCOC_2H_5$ | 527 |
| 5 | $CH_3$ | CN | CN | H | $C_3H_6OC_4H_8OCOCH_2CH(CH_3)_2$ | 527.5 |
| 6 | $CH_3$ | $COOC_2H_5$ | CN | H | $C_3H_6OC_4H_8OCOCH_3$ | 518 |
| 7 | $CH_3$ | $COOC_2H_5$ | CN | H | $C_3H_6OC_4H_8OCH_2CH(CH_3)_2$ | 518.5 |
| 8 | $CH_3$ | CN | CN | H | $C_3H_6OC_2H_4OCH_3$ | 528.5 |
| 9 | $CH_3$ | CN | CN | H | $C_3H_6OC_2H_4OC_2H_5$ | 523 |
| 10 | $CH_3$ | CN | CN | H | $C_3H_6OC_2H_4OC_4H_9$ | 523 |
| 11 | $CH_3$ | $COOC_2H_5$ | CN | H | $C_3H_6OC_4H_8OC_2H_5$ | 521.2 |
| 12 | $CH_3$ | $COOCH_3$ | CN | H | $C_3H_6OC_4H_8OC_4H_9$ | 520.2 |
| 13 | $CH_3$ | $COOC_2H_5$ | CN | H | $C_3H_6OC_4H_8OC_4H_9$ | 520 |
| 14 | $CH_3$ | $COOC_2H_5$ | CN | H | $C_3H_6OC_2H_4OC_4H_9$ | 522.7 |
| 15 | $CH_3$ | $COOC_3H_7$ | CN | H | $C_3H_6OC_2H_4OCH_3$ | 523.2 |
| 16 | $CH_3$ | CN | CN | H | $C_3H_6OC_4H_8OCOCH_3$ | 525 |
| | | | | | $C_3H_6OC_2H_4OC_4H_9$ | |
| 17 | $CH_3$ | CN | CN | $C_2H_4OCH_3$ | $C_3H_6OC_4H_8OH$ | 534.3 |
| 18 | $CH_3$ | CN | CN | $C_2H_4OCH_3$ | $C_3H_6OC_4H_8OCOCH_3$ | 535.8 |
| 19 | $CH_3$ | CN | CN | $C_2H_4OCOCH_3$ | $C_3H_6OC_4H_8OC_2H_5$ | 535.3 |
| 20 | $CH_3$ | CN | CN | $C_2H_4OH$ | $C_3H_6OC_2H_4 OC_2H_5$ | 535.8 |
| 21 | $CH_3$ | CN | CN | $C_2H_4OCOCH_3$ | $C_2H_4OC_2H_5$ | 533.8 |
| 22 | $CH_3$ | CN | CN | $C_3H_6OCH_3$ | $C_3H_6OC_2H_4OC_4H_9$ | 537.8 |
| 23 | $CH_3$ | CN | CN | $C_3H_6OCH_3$ | $C_3H_6OC_4H_8OH$ | 536.3 |
| 24 | $CH_3$ | $COOC_2H_5$ | CN | $C_3H_6OH$ | –$\phi$ | 542 |
| 25 | $CH_3$ | $COOC_2H_5$ | CN | $C_3H_6OCOCH_3$ | –$\phi$ | 541.3 |

-continued

| No. | R1 | R2 | R3 | R4 | R5 | Value |
|---|---|---|---|---|---|---|
| 26 | CH₃ | COOC₂H₅ | CN | H | C₃H₆OCH₂—CH(C₂H₅)(C₄H₉) | 524 |
| 27 | CH₃ | COOC₂H₅ | COOCH₃ | H | C₃H₆OC₄H₈OC₂H₅ | 512.7 |
| 28 | CH₃ | COOC₂H₅ | COOCH₃ | H | C₃H₆OC₄H₈OC₄H₉ | 511.7 |
| 29 | CH₃ | COOC₂H₅ | COOCH₃ | C₃H₆OCH₃ | C₃H₆OCH₃ | 523.2 |
| 30 | CH₃ | COOC₂H₅ | COOCH₃ | C₃H₈OCH₃ | C₃H₆OC₄H₈OC₄H₉ | 526 |
| 31 | CH₃ | CN | CN | H | C₃H₆OC₄H₈OC₂H₅ | 525.3 |
| 32 | CH₃ | CN | CN | H | C₃H₈OC₄H₈OC₄H₉ | 525.8 |
| 33 | CH₃ | CN | CN | H | C₃H₆OC₂H₄O—C₆H₅ | 528 |
| 34 | CH₃ | CN | CN | H | C₃H₆OCH₂—CH(C₂H₅)(C₄H₉) | 528 |
| 35 | CH₃ | CN | CN | H | —C₆H₅ | 538.6 |
| 36 | CH₃ | CN | CN | H | —C₆H₄—OCH₃ (p) | 547.5 |
| 37 | CH₃ | COOC₂H₅ | COOCH₃ | H | C₃H₆OC₄H₈OCOC₂H₅ | 517.7 |
| 38 | CH₃ | COOC₂H₅ | COOCH₃ | H | C₃H₆OC₄H₈OCOCH₃ | 517.8 |
| 39 | CH₃ | CN | CN | C₃H₆OCOCH₃ | o-CH₃O—C₆H₄— | 547.8 |
| 40 | CH₃ | CN | CN | C₃H₈OCOCH₃ | —C₆H₄—OCH₃ | 553.8 |
| 41 | CH₃ | CN | CN | C₃H₈OCOCH₃ | —C₆H₅ | 546.3 |
| 42 | CH₃ | CN | CN | —C₆H₅ | C₃H₆OCOCH₃ | 548.3 |
| 43 | CH₃ | CN | CN | o-CH₃O—C₆H₄— | C₃H₆OCOCH₃ | 550.8 |
| 44 | CH₃ | CN | CN | cyclohexyl-H | o-OCH₃—C₆H₄— | 549 |
| 45 | CH₃ | CN | CN | C₃H₆OH | —C₆H₅ | 549 |

-continued

| | | | | | | |
|---|---|---|---|---|---|---|
| 46 | CH₃ | CN | CN | C₃H₆OH | 4-methoxyphenyl | 554 |
| 47 | CH₃ | CN | CN | cyclohexyl (H) | 4-methoxyphenyl | 555 |
| 48 | CH₃ | CN | CN | C₃H₈OCH₃ | C₃H₆OCH₃ | 534.3 |
| 49 | CH₃ | CN | CN | C₂H₄OCH₃ | C₂H₄OCH₃ | 535.3 |
| 50 | CH₃ | CN | CON(C₂H₅)₂ | H | C₃H₆OC₄H₈OCOCH₃ | 507.5 |
| 51 | CH₃ | CN | CON(C₂H₅)₂ | H | C₃H₆OC₂H₄OCH₃ | 511 |
| 52 | CH₃ | CN | CON(C₂H₅)₂ | H | CH(CH₃)CH—OCH₃ | 510.2 |
| 53 | CH₃ | COOC₂H₅ | CH₃CO | C₂H₅ | C₃H₆OC₄H₈OCOCH₃ | 528.8 |
| 54 | CH₃ | COOC₂H₅ | CH₃CO | H | C₃H₆OC₄H₈OCOCH₃ | 517.7 |
| 55 | CH₃ | COOC₂H₅ | COOCH₃ | C₂H₅ | C₃H₆OC₂H₄OC₄H₉ | 535 |
| 56 | CH₃ | COOC₂H₅ | CN | H | C₃H₆OC₂H₄O-phenyl | 524 |
| 57 | CH₃ | COOC₂H₅ | CN | H | phenyl | 532.5 |
| 58 | CH₃ | COOC₂H₅ | CN | H | 2-methoxyphenyl | 534 |
| 59 | CH₃ | CN | CN | H | C₂H₄OC₂H₄OCOC₂H₅ | 525.8 |
| 60 | CH₃ | CN | CN | H | C₂H₄OC₂H₄OH | 527.3 |
| 61 | CH₃ | CN | CN | C₂H₅ | C₃H₆OC₄H₈OCOC₂H₅ | 537.3 |
| 62 | CH₃ | CN | CN | C₂H₅ | C₃H₆OC₂H₄OC₄H₉ | 535.8 |
| 63 | CH₃ | CN | CN | C₂H₅ | C₃H₈OC₂H₄OH | 535.8 |
| 64 | CH₃ | CN | CN | C₃H₆OCH₃ | C₃H₆OC₄H₈OCOCH₃ | 537.8 |
| 65 | CH₃ | CN | CN | C₃H₆OC₂H₄OCH₃ | C₂H₄OH | 536.3 |
| 66 | CH₃ | CN | CN | C₃H₆OC₂H₄OCH₃ | C₂H₄OCOC₂H₅ | 535.8 |
| 67 | CH₃ | CN | CN | H | CH(CH₃)CH₂—OCH₃ | 526.3 |
| 68 | CH₃ | CN | CN | CH(CH₃)₂ | C₃H₆OC₄H₈OCOCH₃ | 537.8 |
| 69 | phenyl | CN | CN | H | C₃H₆O(C₂H₄O)₂C₂H₅ | 523 |
| 70 | CH₃ | CN | CN | C₃H₆OC₄H₈OCOCH₃ | H | 522 |
| 71 | CH₃ | CN | CN | CH(C₂H₅)CH₂OCOCH₃ | H | 518 |
| 72 | CH₃ | CN | CN | CH(CH₃)C₂H₄OCOCH₃ | H | 518 |
| 73 | CH₃ | CN | CN | CH(CH₃)C₃H₆CH(CH₃)₂ | H | 523 |
| 74 | CH₃ | CN | CN | CH(CH₃)C₃H₆C(CH₃)₂OH | H | 522 |
| 75 | CH₃ | CN | CN | C₃H₆OCH(CH₃)CH₂OCH₃ | H | 522 |
| 76 | CH₃ | CN | CN | C₃H₆OCH₂CH(CH₃)OCH₃ | H | 523 |
| 77 | CH₃ | CN | CN | C₃H₆O(C₂H₄O)₂C₂H₅ | H | 522 |

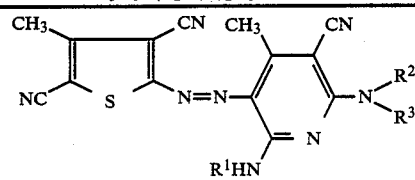

| Example No. | R¹ | R² | R³ | λ max [nm] (Acetone) |
|---|---|---|---|---|
| 78 | C₃H₆OCH₃ | CH₃ | C₂H₄OCH₃ | 543 |
| 79 | C₃H₆OCH₃ | C₂H₅ | C₂H₅ | 544 |
| 80 | C₃H₆OCH₃ | C₄H₉ | C₂H₄OH | 544 |

-continued

| | | | | |
|---|---|---|---|---|
| 81 | $C_3H_6OCH_3$ | $C_2H_4OCH_3$ | $C_2H_4OH$ | 543 |
| 82 | $C_3H_6OCH_3$ | $C_2H_5$ | $C_2H_4OCOCH_3$ | 544 |
| 83 | $C_2H_4OCH_3$ | $C_4H_9$ | $C_2H_4OCOCH_3$ | 542 |
| 84 | $C_2H_5$ | $C_4H_9$ | $C_2H_4OCOCH_3$ | 544 |
| 85 | $C_3H_6OCOCH_3$ | ⌐⌐ | | 544 |
| 86 | $C_3H_6OCOCH_3$ | ⬡ | | 544 |

We claim:

1. A compound of formula I

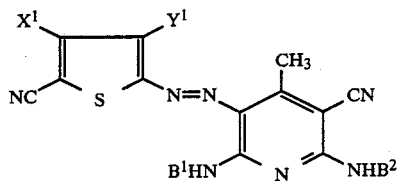

where $X_1$ is hydrogen or methyl; $Y_1$ is $COOCH_3$, $COOC_2H_5$, $COOC_3H_7$, $COOC_4H_9$ or $COOC_2H_4OCH_3$ and $B^1$ and $B^2$ independently of one another are each hydrogen or (i) $C_2$–$C_8$-alkyl which is unsubstituted;

(ii) $C_2$–$C_8$-alkyl which is substituted by hydroxyl, $C_1$–$C_8$-alkanoyloxy, $C_1$–$C_4$-alkoxy, benzyloxy, or phenoxy;

(iii) $C_2$–$C_8$-alkyl which is interrupted by oxygen, exclusive of (ii); or (iv) $C_2$–$C_8$-alkyl which is interrupted by oxygen and substituted by hydroxy, $C_1$–$C_8$-alkanoyloxy, $C_1$–$C_4$-alkoxy, benzyloxy or phenoxy, exclusive of (ii) and (iii).

2. The compound of claim 1, where X is methyl.

3. The compound of claim 1, where one of the radicals $B^1$ and $B^2$ is $C_2H_4OC_2H_4OCOCH_3$, $C_2H_4OC_2H_4OCOC_2H_5$, $C_3H_6OC_4H_8OH$, $C_3H_6OC_4H_8OCOCH_3$, $C_3H_6OC_4H_8OCOC_2H_5$, $C_3H_6OC_2H_4OCH_3$, $C_2H_4OC_2H_5$, $C_3H_6OC_2H_4OC_4H_9$, $C_3H_6OC_4H_8OC_2H_5$, $C_3H_6OC_4H_8OC_4H_9$, $C_3H_6OCH_2C_6H_5$, $C_3H_6OC_2H_4OC_6H_5$ or $C_3H_6OCH_2CH(C_2H_5)C_4H_9$, or where one of the radicals $B^1$ and $B^2$ is $C_2H_4OH$, $C_3H_6OH$, $C_2H_4OCOCH_3$, $C_2H_4OCOC_2H_5$, $C_2H_4OCH_3$, $C_3H_6OCH_3$, $CH(CH_3)_2$ or $C_4H_9$ and the other is $C_2H_4OC_2H_4OCOCH_3$, $C_3H_6OC_4H_8OH$, $C_3H_6OC_4H_8OCHO$, $C_3H_6OC_4H_8OCOCH_3$, $C_3H_6OC_4H_8OCOC_2H_5$, $C_3H_6OC_2H_4OC_4H_9$, $C_3H_6OC_4H_8OC_2H_5$, $C_3H_6OC_4H_8OC_4H_9$, or where one of the radicals $B^1$ and $B^2$ $C_3H_6OC_2H_4OC_6H_5$ is $C_2H_4OH$, $C_3H_6OH$, $C_2H_4OCOCH_3$, $C_2H_4OCOC_2H_5$, $C_3H_6OCOCH_3$ or $C_3H_6OCOC_2H_5$ and the other is $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, or $C_3H_6OC_4H_8OC_4H_9$.

4. The compound of claim 1, where one of the radicals $B^1$ and $B^2$ is hydrogen and the other is $C_2H_4OC_2H_4OCOCH_3$, $C_2H_4OC_2H_4OCOC_2H_5$, $C_3H_6OC_4H_8OH$, $C_3H_6OC_4H_8OCOCH_3$, $C_3H_6OC_4H_8OCOC_2H_5$, $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, $C_3H_6OC_4H_8OC_4H_9$, $C_3H_6OCH_2C_6H_5$, $C_3H_6OC_2H_4OC_6H_5$ or $C_3H_6OCH_2CH(C_2H_5)C_4H_9$.

5. The compound of claim 1, where one of the radicals $B^1$ and $B^2$ is $C_2H_5$, $C_2H_4OCH_3$, $C_3H_6OCH_3$, $CH(CH_3)_2$ or $C_4H_9$ and the other is $C_2H_4OC_2H_4OCOCH_3$, $C_3H_6OC_4H_8OH$, $C_3H_6OC_4H_8OCHO$, $C_3H_6OC_4H_8OCOCH_3$, $C_3H_6OC_4H_8OCOC_2H_5$, $C_3H_6OC_2H_4OC_4H_9$, $C_3H_6OC_4H_8OC_2H_5$, $C_3H_6OC_4H_8OC_4H_9$ or $C_3H_6OC_2H_4OC_6H_5$.

6. The compound of claim 1, where one of the radicals $B^1$ and $B^2$ is $C_2H_4OH$, $C_3H_6OH$, $C_2H_4OCOCH_3$, $C_2H_4OCOC_2H_5$, $C_3H_6OCOCH_3$ or $C_3H_6OCOC_2H_5$ and the other is $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, or $C_3H_6OC_4H_8OC_4H_9$.

* * * * *